United States Patent [19]

Flannery

[11] Patent Number: 5,799,196
[45] Date of Patent: Aug. 25, 1998

[54] METHOD AND APPARATUS OF PROVIDING POWER MANAGEMENT USING A SELF-POWERED UNIVERSAL SERIAL BUS (USB) DEVICE

[75] Inventor: Michael R. Flannery, Sioux City, Iowa

[73] Assignee: Gateway 2000, Inc., North Sioux City, S. Dak.

[21] Appl. No.: 677,325

[22] Filed: Jul. 2, 1996

[51] Int. Cl.⁶ ........................................... G06F 1/32
[52] U.S. Cl. ........................................... 395/750.03
[58] Field of Search ................. 395/750, 750.01, 395/750.03; 364/707

[56] References Cited

U.S. PATENT DOCUMENTS

| | | | |
|---|---|---|---|
| 5,167,024 | 11/1992 | Smith et al. | 395/750 |
| 5,197,143 | 3/1993 | Lary et al. | 395/309 |
| 5,237,258 | 8/1993 | Crampton | 320/14 |
| 5,239,495 | 8/1993 | Nanno et al. | 364/707 |
| 5,283,905 | 2/1994 | Saadeh et al. | 395/750 |
| 5,305,459 | 4/1994 | Rydel | 395/750 |
| 5,313,642 | 5/1994 | Seigel | 395/75 |
| 5,355,503 | 10/1994 | Soffel et al. | 395/750 |
| 5,361,364 | 11/1994 | Nagashige et al. | 395/750 |
| 5,381,043 | 1/1995 | Kohiyama et al. | 307/116 |
| 5,384,721 | 1/1995 | Joto | 364/707 |
| 5,410,713 | 4/1995 | White et al. | 395/750 |
| 5,457,785 | 10/1995 | Kikinis et al. | 395/308 |
| 5,483,464 | 1/1996 | Song | 364/492 |
| 5,530,879 | 6/1996 | Crump et al. | 395/750 |
| 5,579,524 | 11/1996 | Kikinis | 395/750 |
| 5,592,632 | 1/1997 | Leung et al. | 395/306 |
| 5,621,898 | 4/1997 | Wooten | 395/297 |
| 5,675,813 | 10/1997 | Holmdahl | 395/750.02 |

OTHER PUBLICATIONS

"Universal Serial Bus Specification", 1.0 Final Draft Revision. Compaq. Digital Equipment Corp., IBM PC Co., Intel, Microsoft, NEC, Northern Telecom, pp. 1–253, (Nov. 13, 1995).

Michael Slater, "Universal Bus To Simplify PC I/O: New interface to service keyboards, mice, telecom, and more.", *Microprocessor Report*, Apr. 17, 1995 vol. 9 No. 5 p1(5), MicroDesign Resources Inc., 8 pgs., (Jan. 14, 1996).

*Primary Examiner*—Ayaz R. Sheikh
*Assistant Examiner*—Sumati Lefkowitz
*Attorney, Agent, or Firm*—Schwegman, Lundberg, Woessner & Kluth, P.A.

[57] ABSTRACT

The capability of a peripheral bus to provide an alternative low power source is combined with existing power management software that controls a computer's main power supply unit to provide stand-by power to logic in the computer that remains active to monitor the system environment for predetermined wake-up events. A self-powered Universal Serial Bus device supplies the minimal power needed by the active logic without the inefficiencies of a dual-stage power supply unit or the expense of incorporating both low-power and a full-power units.

17 Claims, 7 Drawing Sheets

5,799,196

METHOD AND APPARATUS OF PROVIDING POWER MANAGEMENT USING A SELF-POWERED UNIVERSAL SERIAL BUS (USB) DEVICE

FIELD OF THE INVENTION

The present invention is related to computer systems and in particular to power-saving functions for personal computers.

BACKGROUND OF THE INVENTION

Many users of personal computers require that their computer be available to respond to internal or external events on a 24-hour basis. Until recently, those users had to leave their computers powered-on continuously, a practice which consumed unnecessary energy and also placed an excessive load on the computer's power supply unit. To offset these drawbacks while satisfying the demand for around-the-clock availability, computer vendors began offering a "sleep" or suspend mode, first on portable, and then on desktop computer systems. Suspend mode is a low-power state that uses only enough power to enable specialized suspend circuitry in the computer to monitor the computer's environment while the rest of the system is shut-down and drawing no power. When the suspend circuitry detects the occurrence of an internal event, such as an alarm, or an external event, such as an incoming modem call, it quickly resumes full power to the remainder of the computer.

One difficulty in implementing a suspend mode in a computer is providing the small amount of power required by the suspend circuitry. While the obvious solution is to use a single power supply unit designed to provide both full and low power, the reality is that such power units are generally expensive and suffer from poor efficiency at low power levels. Another solution equips the computer with two power supplies: one optimized for full power, the other for low power. However, this design has major drawbacks, in particular the added expense of providing two power supplies and the additional space taken in the computer cabinet by the power supply units.

What is needed, therefore, is an alternative low-power source which interfaces with existing power management software to satisfy the power needs of suspend/resume functions without the inefficiencies and expense of the current solutions.

SUMMARY OF THE INVENTION

A computer system receives stand-by power from a peripheral bus incorporating a power source independent of the main power supply unit of the computer system. A certain portion of the computer logic, including a power manager, is coupled to the main power supply unit and also to the peripheral bus. When the computer enters a suspend mode, the power manager shuts down the main power supply unit but remains active by drawing stand-by power from the peripheral bus. When an event occurs that requires processing by the computer, the power manager turns on the main power supply unit to resume full computer operations.

Existing serial and parallel peripheral buses built into most personal computer systems can route power from the main power supply of the computer to peripherals connected to them. However, the existing buses cannot provide stand-by power to peripherals when the computer is in suspend mode because the main power supply is off, but a bus that draws power from a source independent of the main power supply can provide stand-by power.

Recently, a consortium of computer vendors proposed a new type of bus structure to replace the existing serial peripheral bus. The Universal Serial Bus (USB) open-architecture standard specifies USB devices known as "hubs" that provide attachment points for other USB devices, such as USB-compliant peripherals (called "functions") or additional hubs. Self-powered hubs and functions contain independent power supplies to power themselves, and self-powered hubs can also power any other devices attached to them. A "root" hub embedded in the computer routes data between the USB peripherals and the appropriate processing logic in the computer. The standard also defines USB software that works with current power management software to enable the suspending and resuming of devices attached to the Universal Serial Bus in response to the state of the computer. The combination of the computer, the standard operating system, the root hub, and the USB software is called a USB "host."

A USB host in the subject invention is coupled to a remote USB device located external to the computer. A first power source is coupled to a main power supply unit to provide power for the computer while the remote device receives power from a remote power supply unit coupled to a second power source. The host contains two types of logic: logic which can be powered down and logic which must be continually powered. Both types of logic are coupled to the main power supply unit so that they draw power from the first power source when the computer is operating normally. The continually-powered logic is also coupled to a control switch on the main power supply unit and further coupled to the remote power supply unit. When the computer enters suspend mode, the main power supply unit is turned off but the continually-powered logic remains active by drawing power from the second power source. When an external event occurs that requires processing by the computer, the remote USB device signals the continually-powered logic which then switches on the main power supply unit to resume the powered down logic.

The remote USB device can be either a USB hub or a USB function. When the remote device is a USB hub, the external event is generated by a USB function (peripheral) attached to the hub, such as a keyboard or a mouse. When the remote device is a USB function, the function itself generates the external event that resumes the computer.

Furthermore, when the remote device is a USB hub, specialized suspend/resume circuitry can be located in the computer and coupled to the remote hub. The suspend/resume circuitry comprises a first USB function that draws its power from the second power source. The suspend/resume function is further coupled to the control switch on the main power supply unit. A second USB function, such as a keyboard or mouse, which is also coupled to the USB through the remote hub, provides input data to the computer. When the computer is in suspend mode, input data generated by the second USB function sends a signal on the Universal Serial Bus which causes the suspend/resume function to turn on the main power supply unit so that the computer receives power and resumes full operation.

Combining the ability of the Universal Serial Bus to provide an alternative low power source with existing power management software that controls the computer's main power supply unit provides a superior solution to supplying the power needs of suspend/resume capabilities in a computer without the inefficiencies of a dual-stage power supply unit or the expense of incorporating both low-power and full-power units.

DESCRIPTION OF EMBODIMENTS

Figure 1A:
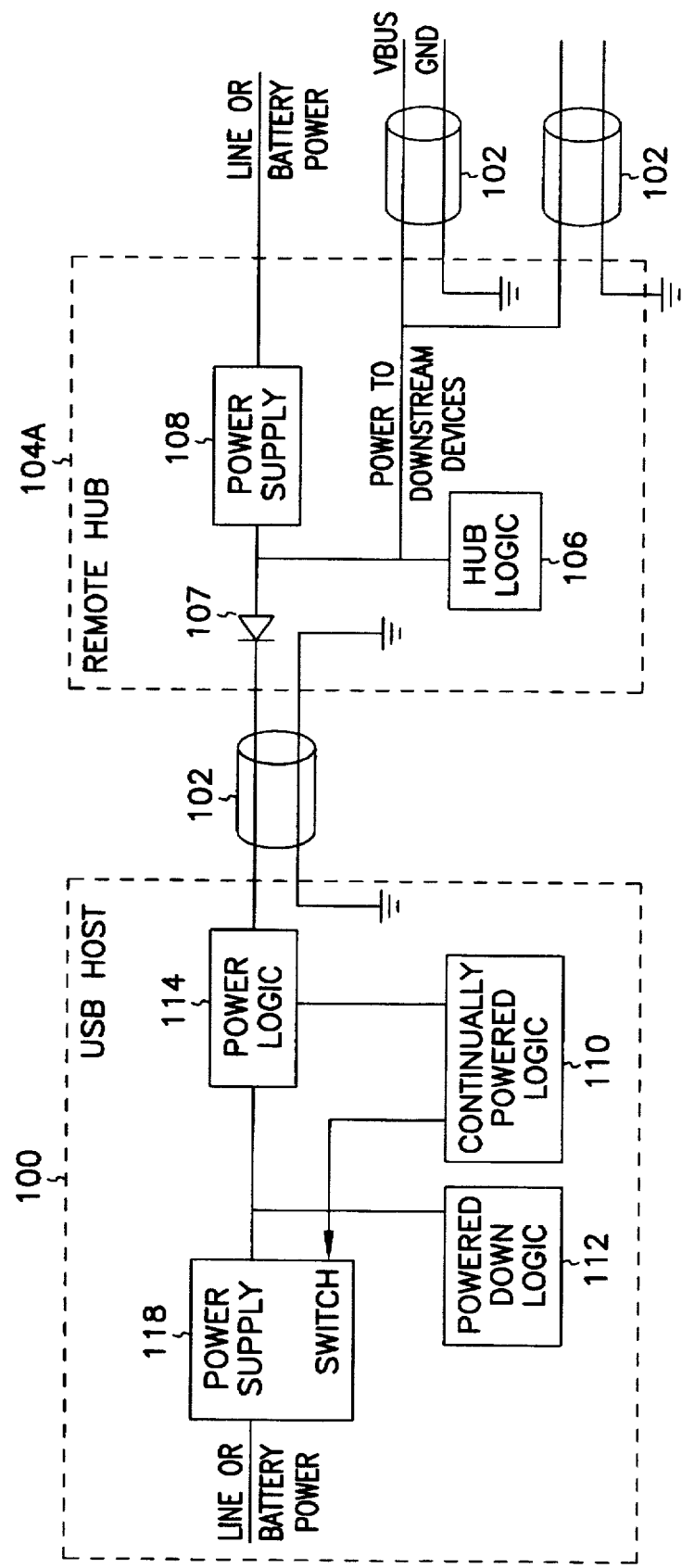
FIG. 1A is a functional block diagram of a computer system configured with a Universal Serial Bus and a self-powered remote USB hub as disclosed in one embodiment of the invention.

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

Numbering in the Figures is usually done with the hundreds digits corresponding to the figure number, with the exception that identical components which appear in multiple figures are identified by the same reference numbers. Signals and connections may be referred to by the same number or label, and the actual meaning should be clear from the context of use.

The Universal Serial Bus (USB) open-architecture standard was developed to alleviate the shortcomings of the existing serial bus interface that connects external peripherals to a personal computer. The standard serial bus cannot sustain the faster data transfer rates required by newer technologies such as audio and video. Furthermore, the existing serial bus must support many different physical connections for the great variety of peripherals that connect to it and must contend with multiple logical interfaces for such devices, making system configuration difficult.

The USB standard specifies a transfer rate of up to 12 Mbps to support telephony, audio and compressed video data streams. It also establishes a universal cable connector which can provide power at various levels to peripherals attached to the bus. In addition, the USB standard defines a common logical interface for all types of peripherals that simplifies the design of supporting USB software and enables easy configuration of a system.

The Universal Serial Bus is logically comparable to the existing serial bus in that each device appears to have a direct connection to the computer, but it is physically configured as a "tiered star" network. At the center of each star is a USB device called a "hub" that serves as the bus connection point for other USB devices, either other hubs or "functions." Functions are generally standard computer peripherals which conform to the USB standard, or specialized circuitry designed to add certain functionality to the computer. Functions can be hardware, firmware, software, or a combination. Each hub has multiple attachment points, known as "ports," to which its functions and other hubs are connected by means of USB-specific cables. Hubs are interconnected to form a USB network containing up to 127 functions.

All but the hub in the top tier (the "root" hub) can be located external to the computer cabinet and are referred to as "remote" or "downstream" hubs. The remote hubs can be stand-alone units or embedded in USB peripherals. All hubs have a number of downstream ports used to attach functions or lower tier hubs, and a single "root" port that connects the hub to a hub in the next highest tier "upstream" in the USB network structure.

The USB network is controlled by the computer and its standard operating system software in conjunction with USB system software. The root hub is embedded in the computer and its root port provides the USB's physical interface to the computer. The combination of the computer, the standard operating system, the root hub, and the USB software is called a USB "host." The USB network performs the standard functions of a communications bus by transferring data and commands from the computer's central processing unit (CPU) to the root hub which passes the information downstream to the appropriate remote hub that controls the receiving function and thence to the function itself. Signals from the function to the CPU retrace the same route in reverse, and traverse the network "upstream" to the host.

Remote hubs are of two basic types: bus-powered and self-powered. Bus-powered hubs draw all their power from their USB connection, while self-powered hubs draw theirs from an external power source, or a combination of both the external power source and the USB. Bus-powered and self-powered hubs both provide power to devices attached to them. However, a bus-powered hub can only re-distribute the amount of power it receives from its connection to the USB, and each downstream port on a bus-powered hub can supply a maximum of 100 mA to its attached device. A self-powered hub must be able to supply 500 mA to each downstream device attached to the hub.

The functions are likewise divided into bus-powered and self-powered classes, with bus-powered functions further categorized as low-power and high-power. Low-power functions can be powered from either type of hub, but high-power functions must be connected to self-powered hubs in order to have sufficient power to operate. Low-power functions are generally peripherals such as a mouse or a keyboard; high-power functions include printers and speakers. Self-powered functions can be attached to either type of hub as the function does not draw its operating power from the hub, although it can draw minimal power from the USB to support itself when in a suspended state.

All USB hubs and functions must enter a minimal power "suspend" state when they detect no I/O activity on their USB connections for a certain period of time. During normal operations, each hub is responsible for passing on a polling signal from the USB host to the devices attached to the hub to prevent them from suspending. Suspended hubs cannot transfer data on the bus until enabled by a "resume" command as discussed below.

A suspend state is triggered when the Universal Serial Bus is quiescent due to the USB host discontinuing all communication traffic, or because of a lack of I/O activity during certain types of computer operations. When each hub detects an idle condition on its root port for at least 3 ms it begins its suspend routine which includes terminating all signals to its downstream ports. As each network tier is suspended, the hubs in the next lower tier will experience an idle condition and enter suspend mode, thus propagating the suspend state downward throughout the USB network. The functions attached to a suspended hub also suspend upon detecting the idle condition.

The system exits the suspend state when a resume signal is issued either by the USB host and passed downstream through the network tiers, or when the internal logic of a suspended function initiates a "remote wakeup resume signal" to be sent upstream to the USB host. In the latter case, an external event, such as the user typing a key or moving a mouse, or an internal event, such as the expiration of a timer, awakens the corresponding function. Since a USB function is only suspended when its section of the USB network is suspended, the appropriate section of the USB network must be resumed before the function can send the event data to the USB host for processing.

When the function is attached to a remote USB hub, it begins the resume process by sending a resume signal to its hub (the "re-enabling" hub). The re-enabling hub immediately drives the resume signal through its root port upstream to the next highest tier, and downstream to its enabled ports and thus to the attached functions and lower tier hubs. The resume signal wakes up each hub in the path from the re-enabling hub to the root hub, and each hub drives the resume signal to its root and enabled downstream ports. When the resume signal arrives at the USB host, the host takes control of the resume process by sending signals back downstream to resume the rest of the USB network and to notify the USB devices that the USB network is enabled. Upon receipt of the notification, the re-enabling hub sends the event signal from the function upstream for processing.

An external event generated by a USB function attached to the USB host through the root hub causes a resume process similar to that described above, except that the function drives the resume signal directly to the host.

Figure 1B:
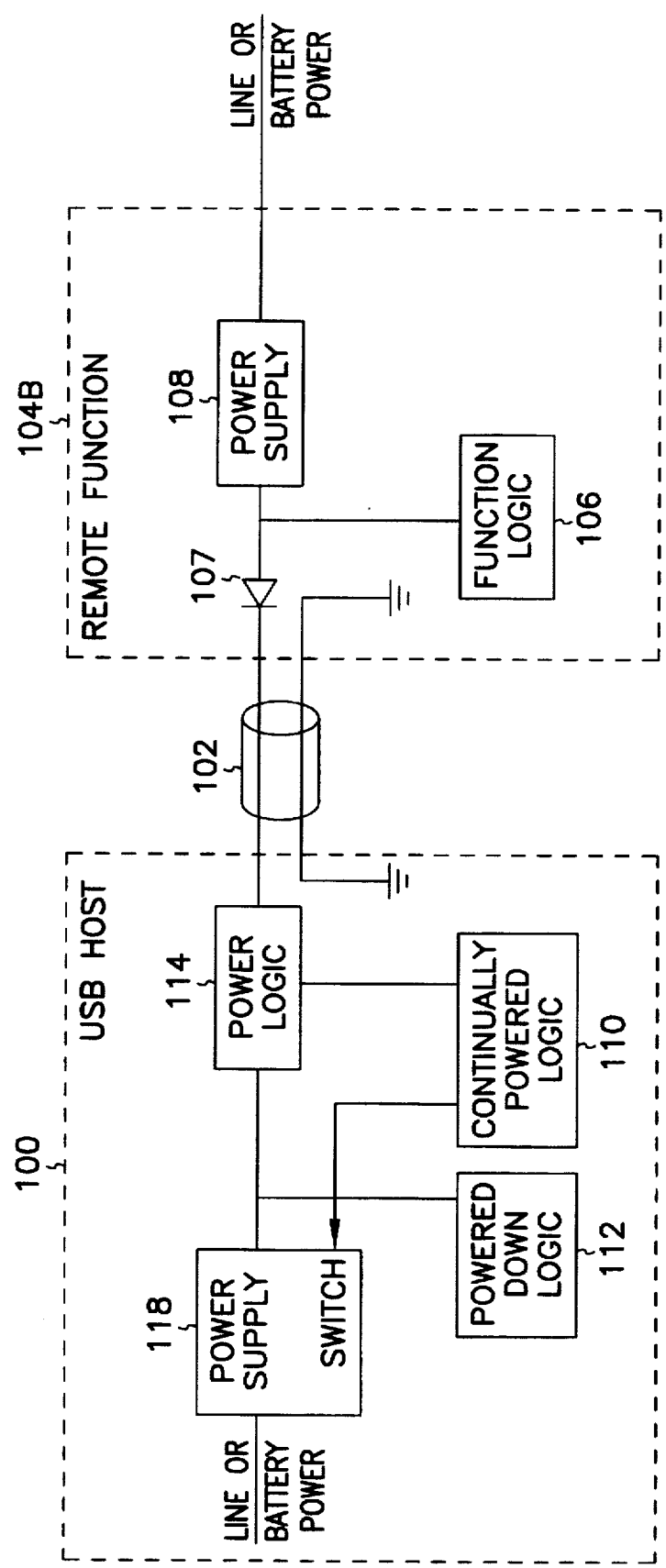
FIG. 1B is a functional block diagram of a computer system configured with a Universal Serial Bus and a self-powered remote USB function as disclosed in one embodiment of the invention.

A personal computer system serving as a USB host 100, as shown in block diagram form in FIGS. 1A and 1B, contains a main power supply unit 118 coupled to a first power source, logic 112 that is powered down when the computer is suspended, such as read-only memory, graphics controllers, and internal peripheral connections, and logic 110 that is continually powered, such as main memory, real-time clock, and the central processing unit. The examples given for logic 112 and 110 are not limiting and it will be apparent to those of skill in the art that firmware, circuitry executing software, and hardware comprising the computer are eligible for inclusion in logic 112 or logic 110.

The USB host 100 also contains a USB root hub (not shown) which serves as the top-level attachment point for USB devices. The USB host 100 is coupled to a self-powered remote USB device. The remote USB device is a USB hub 104A in FIG. 1A and a USB function 104B in FIG. 1B. Both USB devices 104A, 104B contain a remote power supply unit 108 coupled to a second power source, logic 106 specific to the type of the remote device, and a power gate 107, shown as a diode in FIG. 1A and 1B, that prevents power from flowing from the main power supply 118 to the remote device 104A, 104B but permits power from the remote power supply unit 108 to flow to the continually-powered logic 110 as explained below. The power supply units 108 and 118 regulate the voltage supplied by the first and second power sources respectively. The first and second power sources can be batteries, AC wall current, or other well-known power sources.

The connections between USB devices are represented as USB cables 102 in FIGS. 1A and 1B although it will be apparent to those of skill in the art that the Universal Serial Bus comprises the root hub in the USB host 100, the remote USB device 104A, 104B, and any additional USB devices downstream from the USB host 100, as well as the USB cables 102. USB cables 102 contain four wires, two to transmit data, plus VBus and GND wires which deliver power to attached devices. Only VBus and GND wires are shown in FIGS. 1A and 1B. The expansion of the Universal Serial Bus with more remote hubs, additional attached functions, and the placement of the remote device further downstream from the USB host 100 is contemplated by the invention and the operation of the expanded USB in accordance with the disclosure will be apparent to those skilled in the art.

In FIG. 1A, USB-compliant peripherals that generate external event signals, such as a keyboard, a mouse or a modem, are attached downstream to the remote hub 104A which provides full, operating power to those USB peripheral(s) that are bus-powered through remote power supply unit 108. One way to connect the remote power supply unit 108 to the second power source is to embed the remote hub 104A in a USB peripheral which has a direct and continuous AC connection. In one embodiment, the remote hub 104A is placed near the USB peripheral(s) that generate external event signals (mouse, keyboard, modem, etc.) to minimize cable lengths between the peripherals and their attachment points on the hub 104A. Since these types of USB peripherals are usually located near the computer cabinet, in this embodiment the remote hub 104A is embedded in a self-powered peripheral that is also near the computer, such as a set of external speakers. Other self-powered peripherals, such as a modem, are also good candidates to contain the remote hub 104A as will be apparent to those skilled in the art.

In FIG. 1B, the USB function 104B is one of the USB peripherals that generate external event signals. Because the remote function 104B supplies stand-by power to the continually-powered logic 110 when the main power supply unit 118 is turned off, remote function 104B is a self-powered USB function. In one embodiment where the USB peripheral is large, such as a keyboard, the remote power supply unit 108 is embedded in the peripheral. In an alternate embodiment where the peripheral is a mouse, for example, the remote power supply unit 108 is located external to the USB peripheral.

The continually-powered logic 110 in the USB host 100 is coupled to the main power supply unit 118 through two separate connections. One connection supplies power to the circuitry executing the continually-powered logic 110 during normal operations. The continually-powered logic 110 draws stand-by power through its attachment to the remote device 104A, 104B when the powered down logic 112 is in suspend mode and the main power supply unit 118 is turned off. The second connection between the continually-powered logic 110 and the main power supply unit 118 enables the continually-powered logic 110 to turn on the main power supply unit 118 to return full power to the host 100 upon receiving a resume signal from the remote device 104A, 104B or the occurrence of an event in the continually-powered logic 110, such as expiration of a timer. Power logic 114 is coupled to both the main power supply unit 118 and the remote power supply unit 108, and determines from which power supply unit the continually-power logic 110 draws its power. In this embodiment, the power logic 114 is implemented in firmware, but can be implemented as hardware, part of the USB system software, or in a combination of components in the computer as will be apparent to those skilled in the art.

Figure 2:
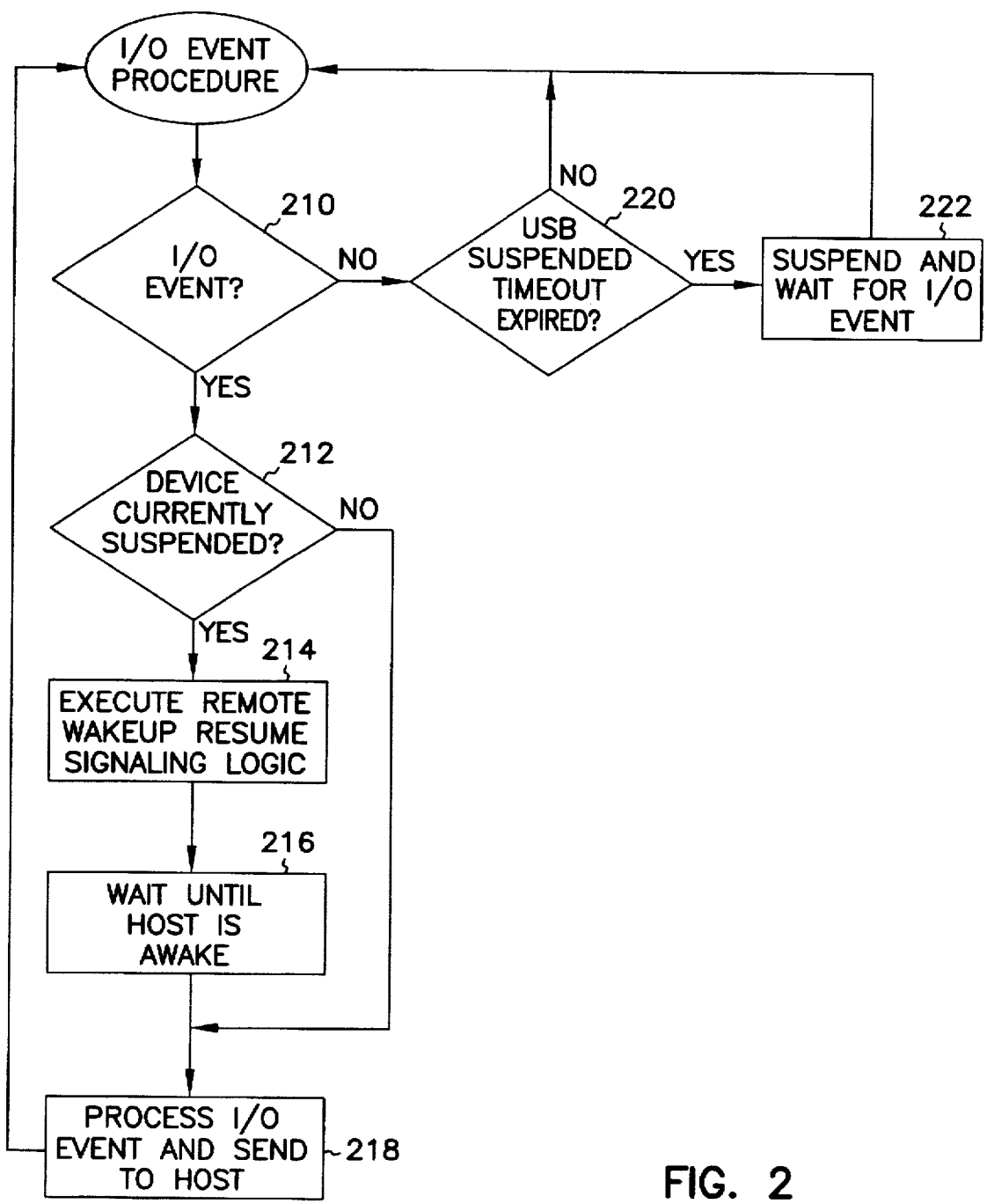
FIG. 2 is a logic flow diagram illustrating a procedure executed by the remote USB hub having an attached peripheral that generates an I/O event for processing by the computer of FIG. 1A.

An external event directed to a USB peripheral, such as a keystroke, a mouse movement, or a modem ring, causes the execution of a process shown in FIG. 2. The process operates slightly differently when the peripheral is active and when it is suspended, and also when the peripheral is attached to a USB remote hub as in FIG. 1A or is a remote function as in FIG. 1B.

When the USB peripheral is active (block 212), it processes the event signal and waits for the next poll from the USB host 100. The data is then transferred at block 218 to the USB host 100 when the USB peripheral is remote function 104B, or to the remote hub 104A which then drives the data through its root port to the USB host 100 when the USB peripheral is attached to remote hub 104A.

When the USB peripheral is suspended, it initiates remote wakeup resume signaling at block 214 and then waits (block 216) until it receives notice that the USB is fully awake before sending the data upstream (block 218). When the USB peripheral is remote function 104B, the resume signal is sent directly to the continually-powered logic 110. When the USB peripheral is attached to the remote hub 104A, the resume signal wakes-up the remote hub 104A. The remote hub 104A passes the resume signal upstream to the continually-powered logic 110, and downstream to any additional attached USB devices (block 214).

Figure 3:
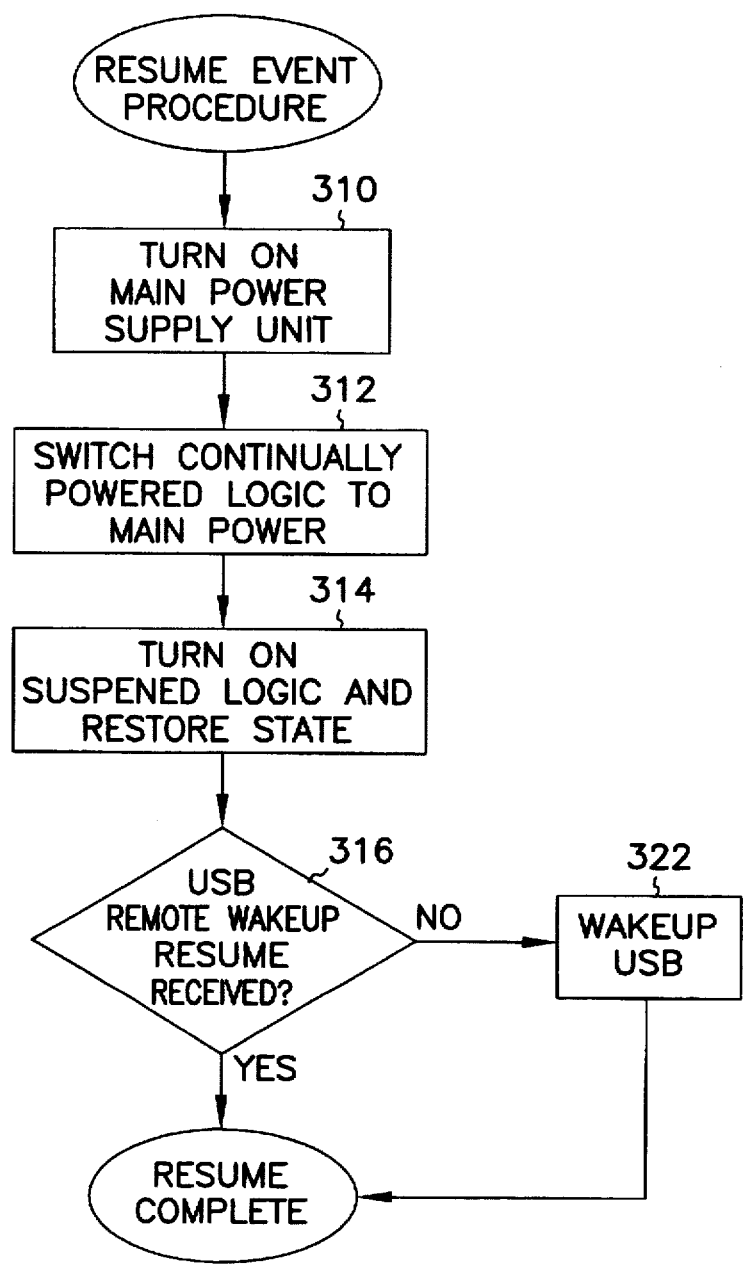
FIG. 3 is a logic flow diagram illustrating a procedure that brings the computer of FIG. 1A back to full-power from a suspended state.

The receipt of the resume signal by the continually-powered logic 110 triggers the process shown in FIG. 3. First, the main power supply unit 118 is switched on by the continually-powered logic 110 at block 310 and the power logic 114 transfers the continually-powered logic 110 from remote power supply unit 108 to main power supply unit 118 (block 312). All suspended computer logic 112 is then turned back on and the state of the system that was saved upon entry into suspend mode is also restored (block 314). Because the triggering event is from USB peripheral (block 316), the now-active USB host 100 re-enables the USB network as explained above. The resume process is now complete and the USB peripheral can transmit its event data to the host.

If an internal event in the continually-powered logic 110, such as an alarm, triggers a resume, the same logic in FIG. 3 is followed, except that the procedure represented by block 322 must be executed in order to resume the USB network since the event did not originate from a USB peripheral.

Figure 4:
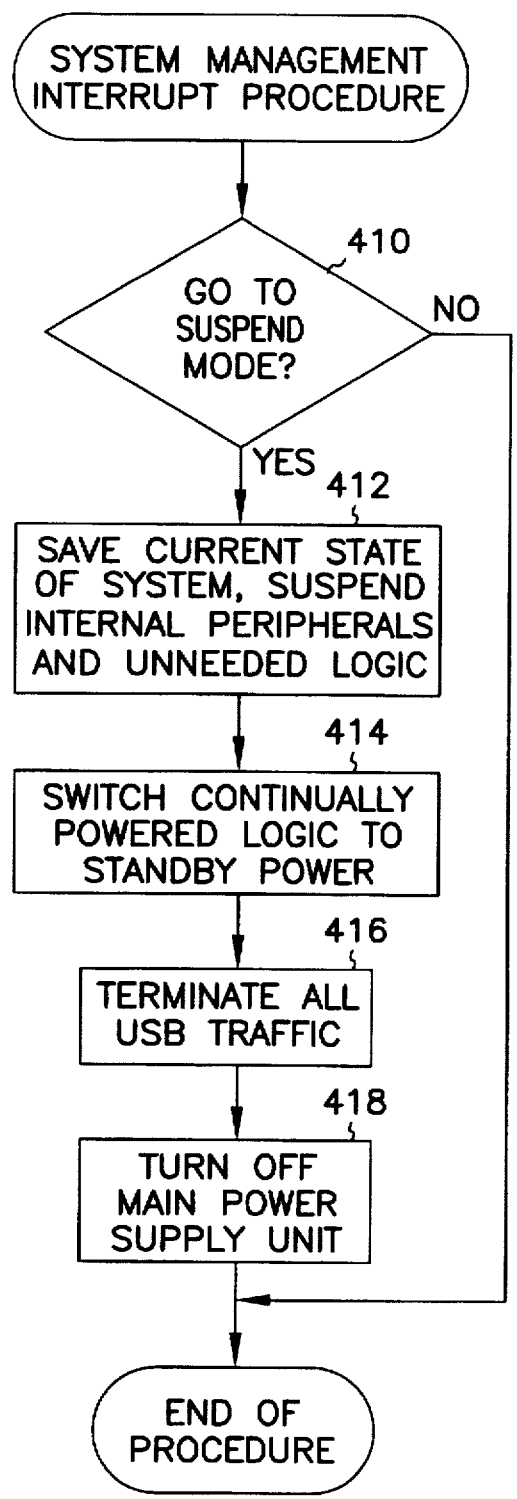
FIG. 4 is a logic flow diagram illustrating a procedure that places the computer of FIG. 1A into a suspended state.

The system suspend procedure follows analogous logic, shown in FIG. 4, when power management software executing in host 100 determines the system should enter suspend mode (block 410). Power management software is typically implemented as part of the operating environment of the host 100, such as APM (Advanced Power Management) in Microsoft Windows 95 or 3.1, and is external to the Universal Serial Bus. However, the USB system software intercepts APM suspend and resume commands. When initiating a suspend state, APM saves the current state of the system and then powers down internal peripherals and logic 112 in the computer at block 412.

The USB system software intercepts the suspend command and signals the power logic 114 to transfer the continually-powered logic 110 from the main power supply unit 118 to the stand-by remote power supply unit 108 (block 414). The USB system software next terminates all USB traffic (block 416). When the root hub in the USB host 100 observes an idle condition on its root port for at least 3 ms, it suspends, and the suspend state propagates downward through the USB network to all the USB devices. After the requisite 3 ms of no I/O traffic, each downstream USB peripheral enters suspend mode as illustrated by blocks 210, 220 and 222 of FIG. 2.

When APM detects the USB network is suspended, it switches off the main power supply unit 118 at block 418. At this point, all bus-powered USB devices that receive their power from the main power supply unit 118 via the USB are powered down. Self-powered USB devices, and downstream bus-powered USB functions that receive power from self-powered hubs, such as remote hub 104A, are suspended. The continually-powered logic 110, drawing power from the remote power supply unit 108, remains enabled so it may resume the USB host 100 when a wake-up event occurs.

Figure 5:
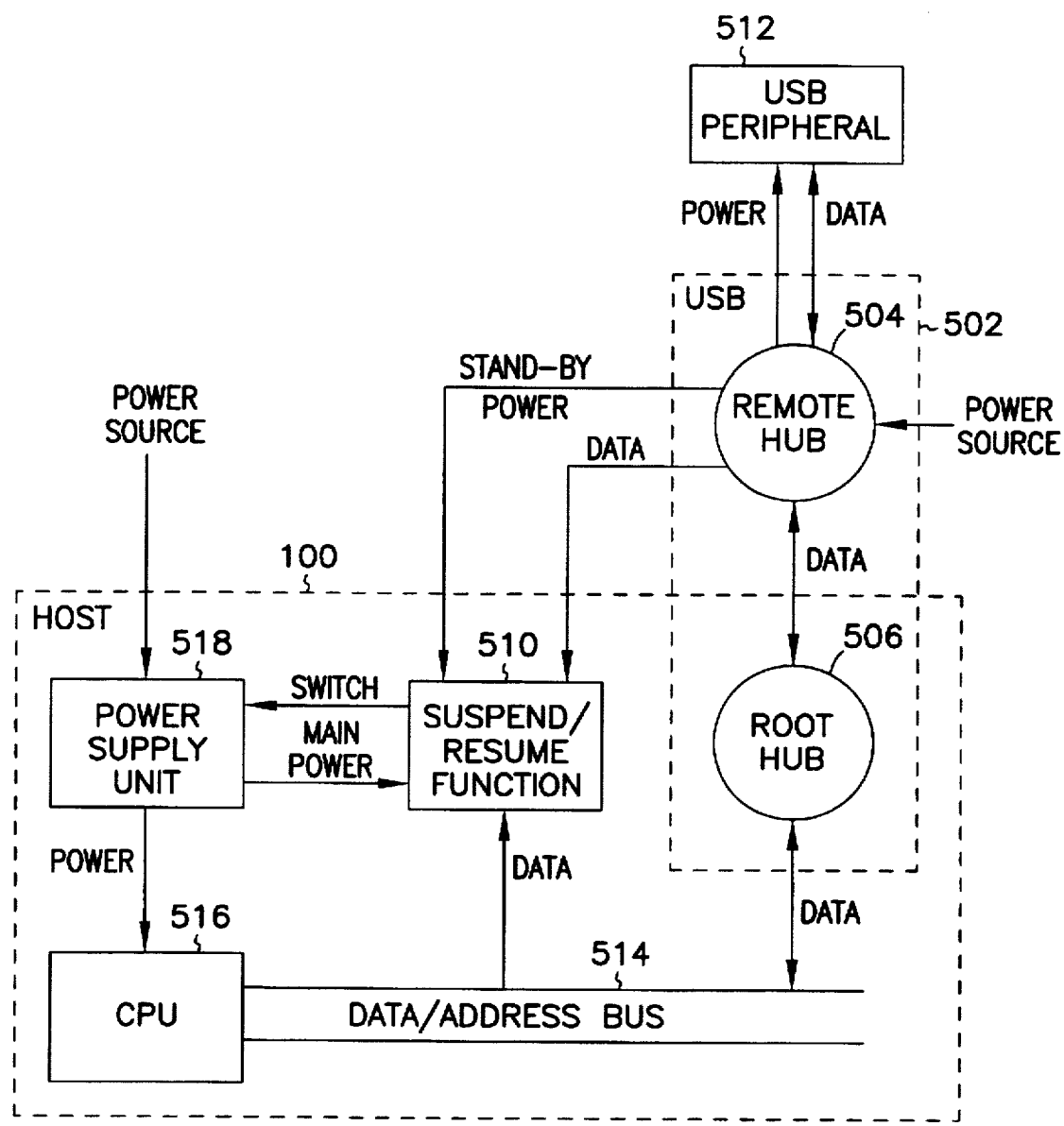
FIG. 5 is a functional block diagram of a computer system configured with a Universal Serial Bus and suspend/resume function as disclosed in one embodiment of the invention.

In an alternate embodiment, the USB host 100 is configured with a root hub 506 and a suspend/resume function 510 as shown in block diagram form in FIG. 5. Although the suspend/resume function 510 is described in terms of a software module executing in a portion of the circuitry of host 100, it will be apparent to those of skill in the art that it can also be implemented as a firmware program, or a logic circuit, or other similar apparatus.

The USB network 502 has two hubs coupled together: the root hub 506 and a self-powered remote hub 504. The root hub 506 is further coupled to an data/address bus 514 so that it can pass data between the USB 502 and the central processing unit (CPU) 516 of the host 100. Peripherals that generate external event signals, such as a keyboard, a mouse or a modem, are attached to the remote hub 504 and shown generically as USB peripheral 512. The remote hub 504 provides full operating power to those USB peripheral(s) 512 that are bus-powered. The expansion of the USB 502 with more remote hubs, additional attached functions, and the placement of the remote hub 504 further downstream from the root hub 506 is contemplated by the invention and the operation of the expanded USB in accordance with the disclosure will be apparent to those skilled in the art.

The suspend/resume function 510 is coupled to a power supply unit 518 through two separate connections. One connection supplies power to the circuitry executing the suspend/resume function 510 during normal operations. The suspend/resume function 510 draws stand-by power through its attachment to one of the downstream ports of the remote hub 504 when the rest of the computer's circuitry is in a suspended state and the power supply unit 518 is turned off. The second connection between the suspend/resume function 510 and the power supply unit 518 enables the suspend/resume function 510 to return full power to the host 100 upon receiving a resume signal from the remote hub 504 or the occurrence of an event in the suspend/resume function's internal logic.

The suspend and resume processes for this embodiment operate similarly to those shown in FIGS. 2 and 4 and described above in conjunction with a USB peripheral attached to remote hub 104A by substituting the suspend/resume function 510 for the continually-powered logic 110.

Figure 6:
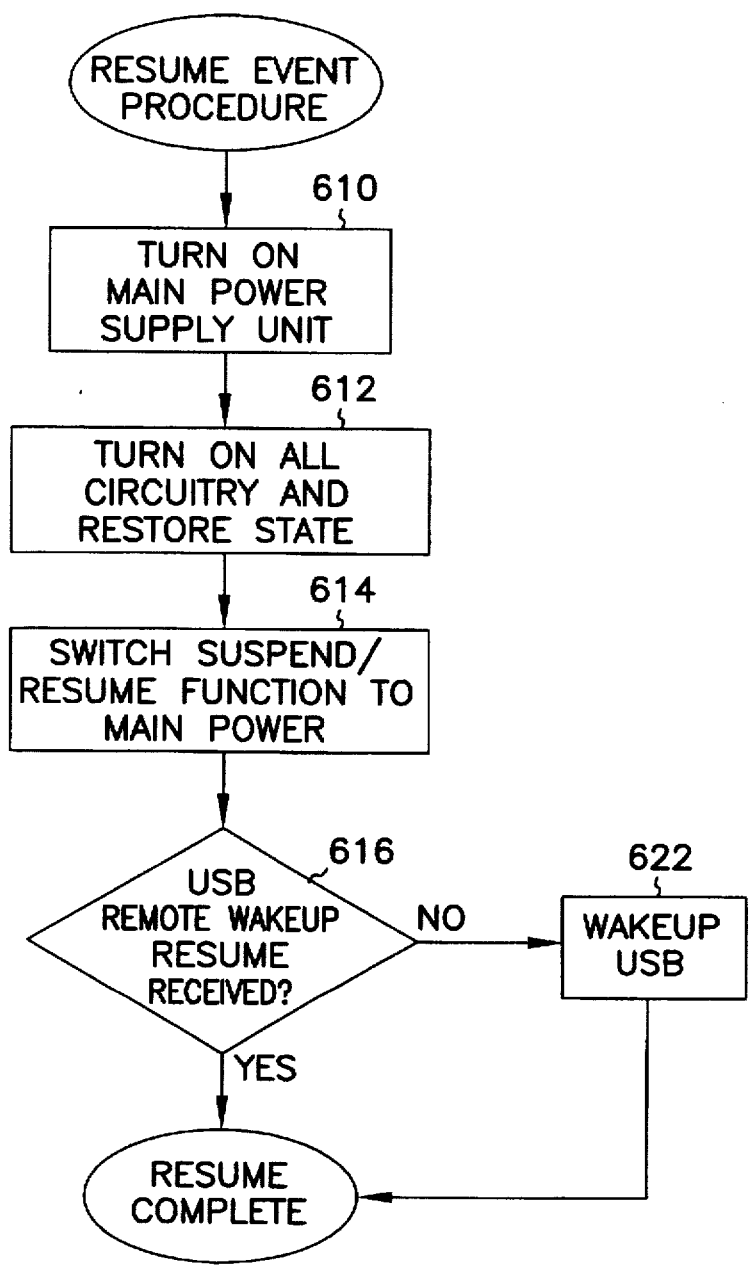
FIG. 6 is a logic flow diagram illustrating a procedure that brings the computer of FIG. 5 back to full-power from a suspended state.

The receipt of the resume signal by the suspend/resume function 510 triggers a process shown in FIG. 6 that has different timing than that shown in FIG. 3. First, the power supply unit 518 is switched on by suspend/resume function 510 at block 610. All suspended computer circuitry is then turned back on and the state of the system that was saved upon entry into suspend mode is also restored (block 612). The now-active host 100 transfers the circuitry running the suspend/resume function 510 from stand-by power to the main power supply unit (block 614). Because the triggering event is from USB peripheral 512 (block 616), the USB is re-enabled by the resume signal as described in conjunction with FIG. 3. The resume process is now complete and the remote hub 504 can transmit its event data.

As before, an internal event in the suspend/resume function 510 causes the procedure represented by block 622 to be executed in order to resume the USB network since the event did not originate from a USB peripheral.

In a further alternate embodiment, the suspend/resume function 510 receives its main power as well as its stand-by power from the remote hub 504 and so is not switched to and from the power supply unit 518.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computer system coupled to a peripheral bus incorporating a power source therein, the computer system comprising:

a central processing unit;

a power supply unit coupled to a power source and coupled to the central processing unit wherein the central processing unit draws power from the power supply unit during normal operation of the computer; and a power manager coupled to the incorporated power source and to the power supply unit to shut down the power supply unit, and to monitor the computer system using power supplied by the incorporated power source when the computer system is in a suspend mode.

2. The computer system of claim 1 wherein the central processing unit and the power manager are coupled to a data/address bus.

3. The computer system of claim 2 wherein the power manager monitors activity on the data/address bus.

4. The computer system of claim 3 wherein an input peripheral is coupled to the data/address bus, and input therefrom causes the power manager to resume normal operation of the computer system.

5. The computer system of claim 1 wherein the power manager receives power from the power supply unit during normal operation of the computer system.

6. A computer system with suspend and resume modes comprising:

a host computer having logic coupled to a main power supply unit, wherein the main power supply unit is further coupled to a first power source wherein the main power supply unit supplies power to the host computer logic during normal operations; and a Universal Serial Bus remote device coupled to the host computer logic and having a remote power supply unit coupled to a second power source, wherein the remote power supply unit supplies power to the host computer logic when the host computer is in suspend mode.

7. The computer system of claim 6, wherein the remote device is a Universal Serial Bus hub.

8. The computer system of claim 7, further comprising a Universal Serial Bus function coupled to the Universal Serial Bus remote hub so that the Universal Serial Bus function directs the host computer logic to turn on the main power supply unit to provide power from the first power source to the host computer to resume normal operations.

9. The computer system of claim 6, wherein the remote device is a Universal Serial Bus function that directs the host computer logic to turn on the main power supply unit to provide power from the first power source to the host computer to resume normal operations.

10. The computer system of claim 6, wherein the host computer logic comprises:

logic that is powered down when the host computer is in suspend mode; and logic that is continually powered by the second power source when the host computer is in suspend mode so that the continually powered logic can direct the main power supply unit to provide power from the first power source to the powered down logic to resume normal operations.

11. A computer system with suspend and resume modes comprising:

a host computer having a central processing unit coupled to a data/address bus and further coupled to a power supply unit, wherein the power supply unit is further coupled to a first power source to supply power to the host computer;

a Universal Serial Bus communicatively coupled to the data/address bus and further coupled to a second power source to supply power to the Universal Serial Bus;

first and second functions communicately coupled to the Universal Serial Bus, wherein the first and second functions draw power from the second power source; and the second function further coupled to the power supply unit whereby a signal sent from the first function on the Universal Serial Bus causes the second function to direct the power supply unit to provide power from the first power source to the host computer.

12. The computer system of claim 11, wherein the Universal Serial Bus comprises:

a Universal Serial Bus root hub communicately coupled to the data/address bus of the host computer; and a Universal Serial Bus remote hub communicately coupled to the Universal Serial Bus root hub and further coupled to the second power source.

13. The computer system of claim 12, wherein the remote hub is physically located external to the host computer.

14. The computer system of claim 12, wherein the first function is an input peripheral communicatively coupled to the remote hub and the second function is suspend/resume circuitry communicatively coupled to the remote hub.

15. The computer system of claim 14, wherein the suspend/resume circuitry receives power from the first power source through its connection to the power supply unit.

16. The computer system of claim 14, wherein the suspend/resume circuitry is further communicately coupled to the data/address bus so that it can receive data from the central processing unit.

17. A method of controlling the source of power used for a computer system having a suspend mode and a normal mode comprising the steps of:

receiving AC power from a main power source;

converting the AC power to DC power by means of a power supply unit wherein the computer system draws the DC power from the power supply in normal mode;

receiving DC power from a power supply incorporated into a peripheral bus via the peripheral bus;

shutting down the power supply unit when the computer enters suspend mode; and monitoring computer system activity using circuitry receiving the DC power from the peripheral bus.

* * * * *